(12) United States Patent
Siniarski

(10) Patent No.: US 6,513,687 B1
(45) Date of Patent: Feb. 4, 2003

(54) BREAKAWAY CUP HOLDER ASSEMBLY

(76) Inventor: Andrew Siniarski, 2( 8-18 Welsford Gardens, North York, Ontario (CA), M3A 2P5

(*) Notice: Subject to any disclaimer, the term of this patent is extended or adjusted under 35 U.S.C. 154(b) by 29 days.

(21) Appl. No.: 09/696,469

(22) Filed: Oct. 25, 2000

Related U.S. Application Data

(60) Provisional application No. 60/161,312, filed on Oct. 25, 1999.

(51) Int. Cl.$^7$ ................................................. B60R 7/06
(52) U.S. Cl. ...................................... 224/282; 224/926
(58) Field of Search ................................ 224/282, 926; 248/311.2; 296/37.12; 297/188.14–188.17; 16/257

(56) References Cited

U.S. PATENT DOCUMENTS

| | | | |
|---|---|---|---|
| 881,492 A | * 3/1908 | Schiller ........................ 108/9 |
| 4,725,089 A | * 2/1988 | Langer ...................... 217/60 D |
| 4,743,060 A | * 5/1988 | Hishida ....................... 16/257 |
| 5,104,187 A | 4/1992 | Fischer et al. |
| 5,342,009 A | 8/1994 | Lehner |
| 5,385,378 A | 1/1995 | Hakamada et al. |
| 5,516,016 A | 5/1996 | Anderson et al. |
| 5,626,318 A | 5/1997 | Boettger et al. |
| 5,628,486 A | 5/1997 | Rossman et al. |
| 5,628,506 A | 5/1997 | Vaught |
| 5,673,890 A | 10/1997 | Duesterberg |
| 5,692,718 A | 12/1997 | Bieck |
| 5,868,448 A | * 2/1999 | Izumo ....................... 217/60 C |
| 6,085,953 A | * 7/2000 | Bober et al. ................. 224/282 |
| 6,152,512 A | * 11/2000 | Brown et al. ............. 296/37.12 |
| 6,227,509 B1 | * 5/2001 | Plocher et al. .............. 248/128 |

* cited by examiner

*Primary Examiner*—Nathan J. Newhouse
(74) *Attorney, Agent, or Firm*—Reising, Ethington, Barnes, Kisselle, Learman and McCulloch, P.C.

(57) ABSTRACT

A breakaway swing-down cup holder assembly including a cup tray that pivots between a horizontal deployed position and a vertical stowed position. Support arms fixed to the cup tray slide through respective apertures in the support panel as the tray moves between the deployed and stowed positions. Arm retainers disposed adjacent the aperture in the support panel arrest downward cup tray movement at the deployed position by engaging and retaining support arm detents. The support arm detents are designed to pull free of the retainers when a predetermined amount of downward force is applied to the cup tray. This allows the tray to give way and drop below the deployed position without damaging the tray, support arms, arm retainers or any associated structures. The support arm detents can be re-engaged with the retainers by merely rotating the cup tray upward into the deployed position with a single motion of one hand and without having to directly manipulate the support arms.

15 Claims, 11 Drawing Sheets

BREAKAWAY CUP HOLDER ASSEMBLY

This application claims priority of U.S. provisional patent application No. 60/161,312 filed Oct. 25, 1999.

TECHNICAL FIELD

This invention relates generally to a breakaway cup holder that allows an automotive vehicle occupant to re-engage support arms of the cup holder after the support arms have been pulled free from respective arm retainers.

BACKGROUND OF THE INVENTION

It is known for automobile interiors to include cup holders supported on automotive interior structures such as instrument panels side trim panels and seats. One common type of cup holder is the swing-down variety that includes a cup tray that is hinged to a supporting structure and is movable between a generally vertical stowed position and a generally horizontal deployed position. Some swing-down cup holders include support arms that connect between the cup tray and respective retainers on the supporting structure to secure the cup tray in the deployed position. It is known for such support arms to be fixed to the cup tray and to slide into the supporting structure through respective receiving apertures when the cup tray is moved to the stowed position. The retainers engage and arrest the support arms when the cup tray reaches the deployed position.

A common problem encountered with such cup holders is that excessive downward forces may occasionally be applied to the cup tray portion in the deployed position. Such forces, typically generated by inadvertently stepping on a deployed cup holder, can force the cup tray downward past the deployed position and can forcibly withdraw and, in so doing, will disengage the support arms from their respective retainers.

Some swing-down cup holders are designed to disengage in this manner without breaking and for re-engagement following an inadvertent disengagement. For example, as shown in FIGS. 1–3, the prior art includes at least one swing-down breakaway cup holder system 1 including support arms 2 that, by direct manipulation, can be re-engaged after being disengaged from respective arm retainers 3. As shown in FIG. 2 a vehicle occupant can re-engage the arms 2 by aligning the arms 2 for re-engagement by directly manipulating the arms 2 then rotating a cup tray 4 of the cup holder 1 upwards. The cup tray 4 of this cup holder system 1 includes a cylindrical recess 5 shaped to receive and support a beverage container in an upright position when the tray 4 is in the deployed position shown in FIG. 1. The two flat metal support arms 2 are connected to the cup tray 4 and extend through respective apertures 6 in a vertical support panel 7 when the tray 4 is in or between the deployed and stowed positions. The support arms 2 are disposed parallel to one another and are positioned to slide into and out of the support panel 7 through the respective apertures 6 when the cup tray 4 is pivoted between the deployed and stowed positions. The support arms 2 have upper distal ends bent outward to form respective arm detents 8. The arm detents 8 are shaped to engage respective outer side edges of the apertures 6 when the tray 4 is in the deployed position. The arm detents 8 engage the aperture side edges in such a way as to arrest downward pivotal motion of the cup tray 4. The support arms 2 are biased outward to insure that the out-turned arm detents 8 will engage the aperture side edges when the tray 4 is swung downward to the deployed position. The arm detents 8 are also designed to deform in such a way as to allow the support arms 2 to disengage from or pull free of the outer side edges of the apertures 6 when a predetermined amount of downward force is applied to the cup tray 4. This allows the cup tray 4 to "break away" from the deployed position and to swing downward, as shown in FIG. 2, without causing plastic deformation in or breakage of any related components.

As shown in FIG. 3, the support arms 2 may be re-engaged by grasping both support arms 2, bending the support arms 2 toward each other such that the arm detents 8 are aligned with the apertures 6, then holding the arms 2 in that aligned position while swinging the cup tray 4 upward so that the arms 2 re-insert into their respective apertures 6. In other words, an automotive vehicle passenger must directly manipulate the support arms 2 to re-install the support arms 2 into their respective apertures 6.

INVENTION SUMMARY

The invention is a breakaway cup holder assembly that enables an automotive vehicle occupant to re-engage a support arm of a swing-down cup holder after the support arm has been pulled free of or otherwise disengaged from an arm retainer. The assembly includes a support panel configured to be supported on an automotive interior structure and a cup tray supported on the support panel for pivotal motion between a generally horizontal deployed position and a generally vertical stowed position. The cup tray is shaped to support and hold upright a beverage container. At least one support arm is connected to the cup tray and is slidably received within an aperture in the support panel when the tray is in or between the deployed and stowed positions. The support arm is positioned to slide through the support panel aperture when the cup tray is pivoted between the stowed position and the deployed position. An arm retainer is disposed on the support panel adjacent the aperture and is configured to arrest downward cup tray movement at the deployed position by engaging and retaining a support arm detent of the support arm when the cup tray reaches the deployed position. The arm retainer and distal end are configured to allow the support arm detent to disengage from the arm retainer when a predetermined amount of downward force is applied to the cup tray. This allows the cup tray to pivot downward past the deployed position without plastically deforming or breaking the tray, the support arm, the arm retainer or any associated structures.

Unlike the prior art, the arm retainer and the support arm are configured and positioned such that upward pivoting of the cup tray following disengagement causes the support arm detent to re-engage the arm retainer. This allows an automotive vehicle passenger to quickly and easily re-engage the support arm using a single motion of one hand and without having to directly manipulate the support arm.

According to another aspect of the invention the support arm includes a curved portion having a generally constant radius curvature. The support arm is fixed to the cup tray in a position disposing the curved portion of the support arm coaxially relative to a pivot axis of the cup tray to allow the curved portion of the support arm so that the support arm can feed into and out of the support panel aperture as the cup tray is pivoted about the pivot axis.

According to another aspect of the invention the support arm includes an arm upper detent formed in an upper edge of the arm and an arm lower detent formed in a lower edge of the arm. The arm retainer includes a retainer upper detent in an upper surface of the aperture and a retainer lower detent in a lower surface of the aperture. The arm upper and lower detents are configured and positioned to engage the retainer upper and lower detents, respectively, when the cup tray is in the deployed position.

According to another aspect of the invention the arm upper and lower detents are shaped to resist both upward and downward pivotal movement of the cup tray when engaging the respective retainer upper and lower detents.

According to another aspect of the invention the support arm is split longitudinally from a distal end of the support arm inward to form a split region having upper and lower engagement fingers. The arm upper detent is formed in an upper edge of the upper engagement finger and the arm lower detent is formed in a lower edge of the lower engagement finger. The split region of the support arm may be configured to resist a predetermined amount of extraction force before the upper and lower engagement fingers will deflect towards each other sufficiently to allow the upper and lower arm detents to disengage from the upper and lower retainer detents.

According to another aspect of the invention a vertical width of the support arm is tapered in the split region such that downward pivotal motion of the cup tray causes the stationary upper and lower retainer detents to compress the upper and lower engagement fingers together as the split region slides through the aperture and then spread apart when the upper and lower arm detents engage the upper and lower retainer detents.

According to another aspect of the invention a ramp is supported adjacent the aperture and is configured and oriented to laterally deflect the distal end of the support arm away from the upper and lower retainer detents as the support arm is being re-inserted into the aperture following disengagement. The ramp is configured and located to allow the support arm to slide off the ramp and spring back into alignment with the retainer detents once a narrower portion of the arm reaches the ramp during re-insertion.

According to another aspect of the invention a second ramp is supported adjacent the aperture and is configured and oriented to urge the distal end of the support arm laterally into alignment with the retainer detents as the support arm is being drawn outward through the aperture as the cup tray is pivoted downward into the deployed position.

According to another aspect of the invention the cup tray includes an outer shell and an inner shell that closes an upper opening of the outer shell. The inner shell includes a recess shaped to support and hold upright a beverage container and an opening configured and positioned to receive a base portion of the support arm.

According to another aspect of the invention the lower distal end of the base portion of the support arm is received in a walled pocket that extends upward from an inner surface of the outer shell. The walled pocket is configured to preclude lateral movement of the lower distal end of the base portion of the support arm.

According to another aspect of the invention the support arm includes a flange that extends integrally outward at the approximate location along the length of the arm where the curved portion joins the base portion of the support arm. The flange is positioned to engage an inner surface of the inner shell to retain the support arm against withdrawal from the cup tray.

BRIEF DESCRIPTION OF THE DRAWINGS

These and other features and advantages of the invention will become apparent to those skilled in the art in connection with the following detailed description, photos and drawings, in which.

DETAILED DESCRIPTION

Figure 1:
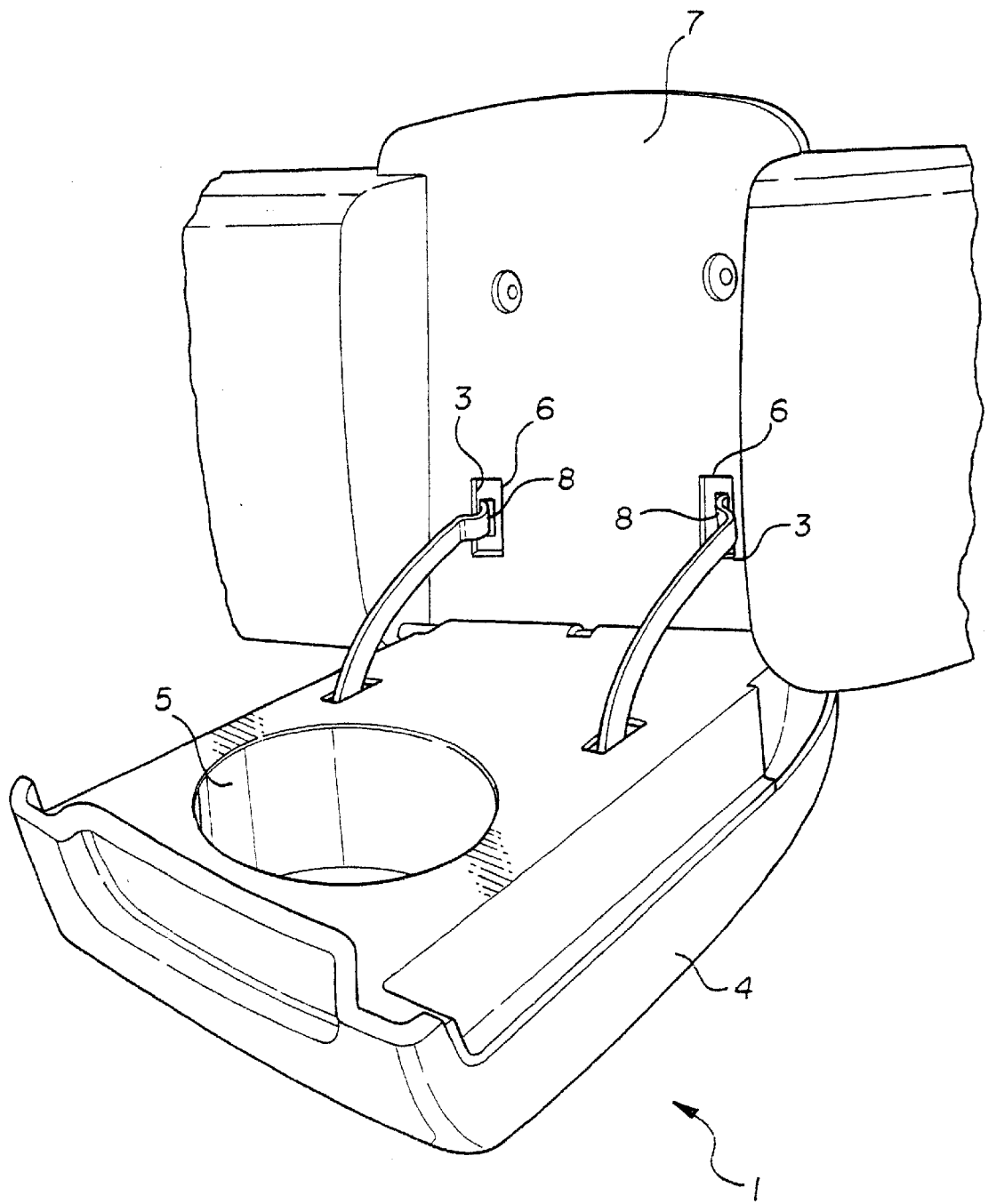
FIG. 1 is a perspective view of a prior art breakaway cup holder with a cup tray potion of the cup holder in a deployed position.
Figure 2:
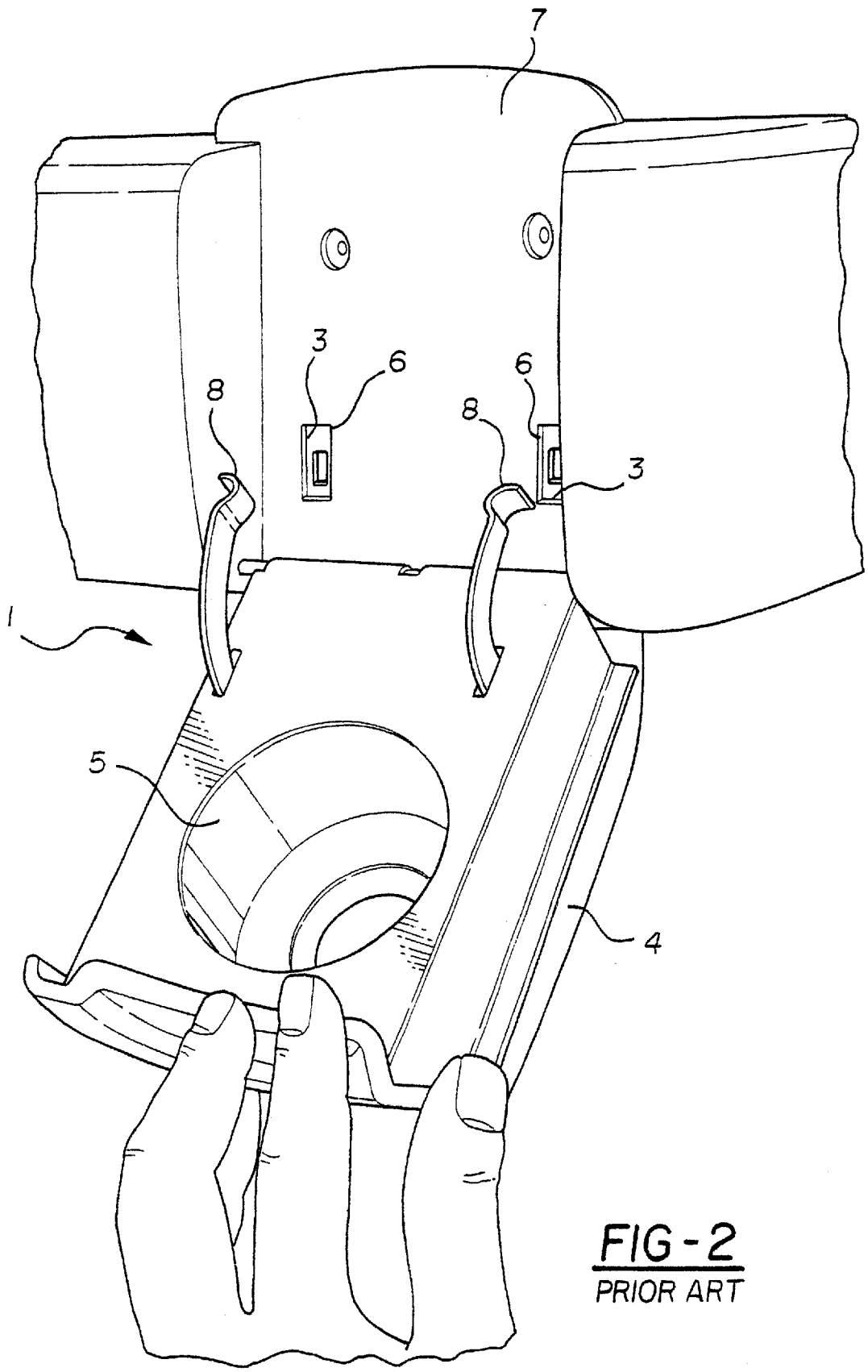
FIG. 2 is a perspective view of the prior art breakaway cup holder of FIG. 1 with the cup tray portion of the cup holder rotated past the deployed position and support arms disengaged from respective arm retainers.
Figure 3:
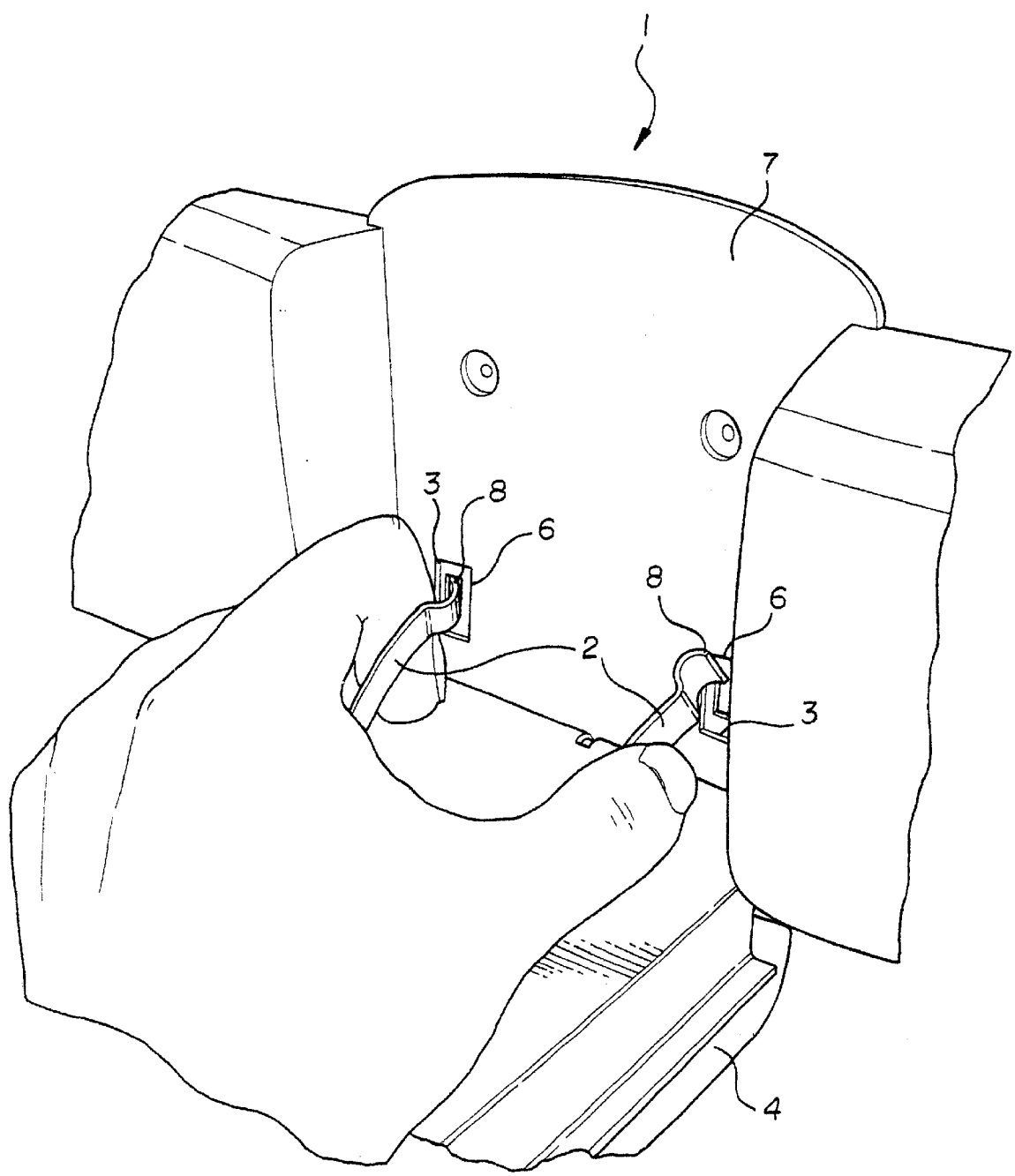
FIG. 3 is a perspective view of the prior art breakaway cup holder of FIG. 1 with the support arms being manually squeezed together into alignment with respective support panel apertures.
Figure 4:
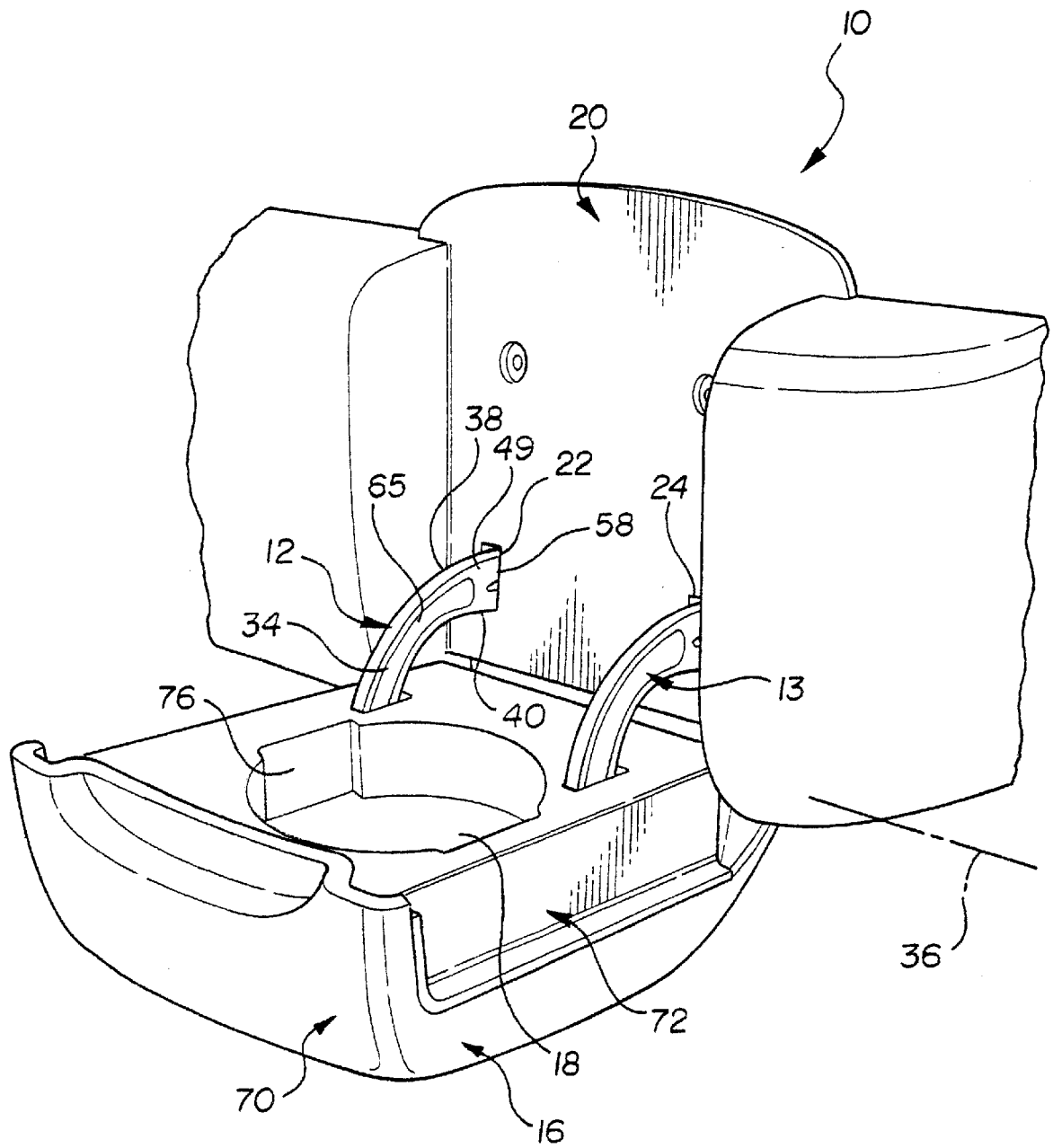
FIG. 4 is a perspective view of a breakaway cup holder assembly constructed according to the present invention with a cup tray of the assembly in a deployed position.
Figure 5:
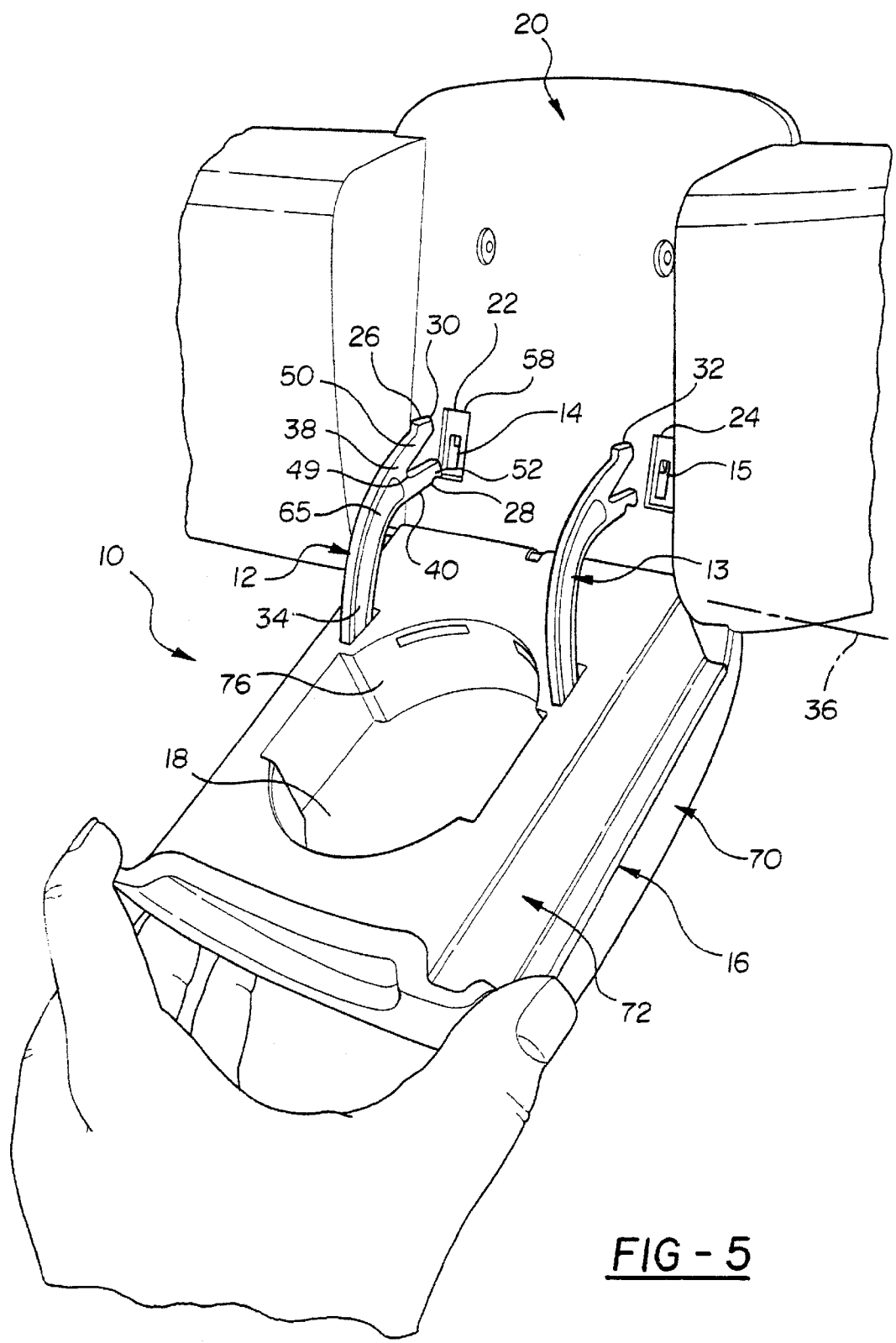
FIG. 5 is a perspective view of the cup holder assembly of FIG. 4 with the cup tray pivoted below the deployed position and support arms of the assembly withdrawn from respective apertures in a support panel of the assembly and disengaged from respective arm detents.
Figure 6:
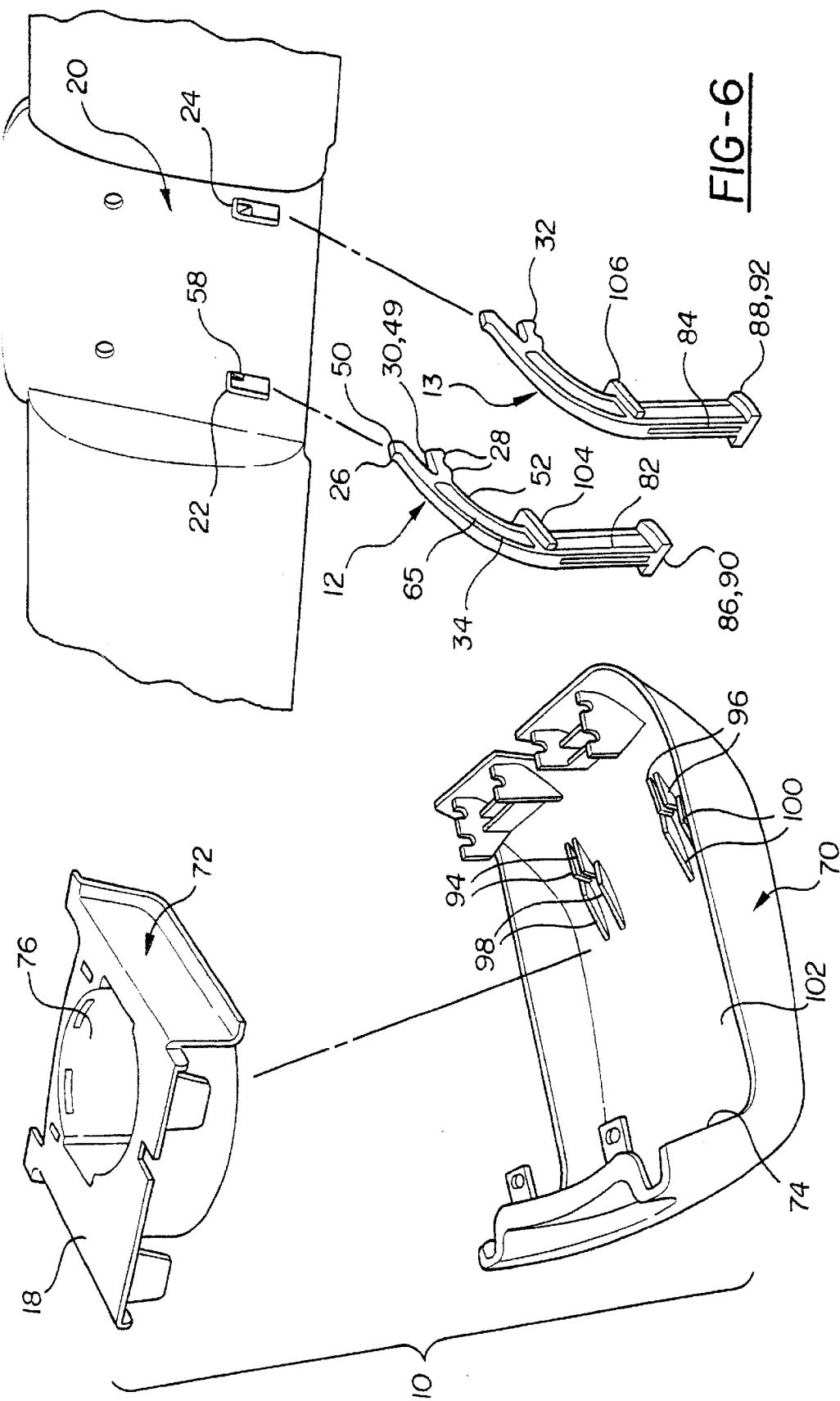
FIG. 6 is an exploded perspective view of the assembled cup holder assembly of FIG. 4.
Figure 11:
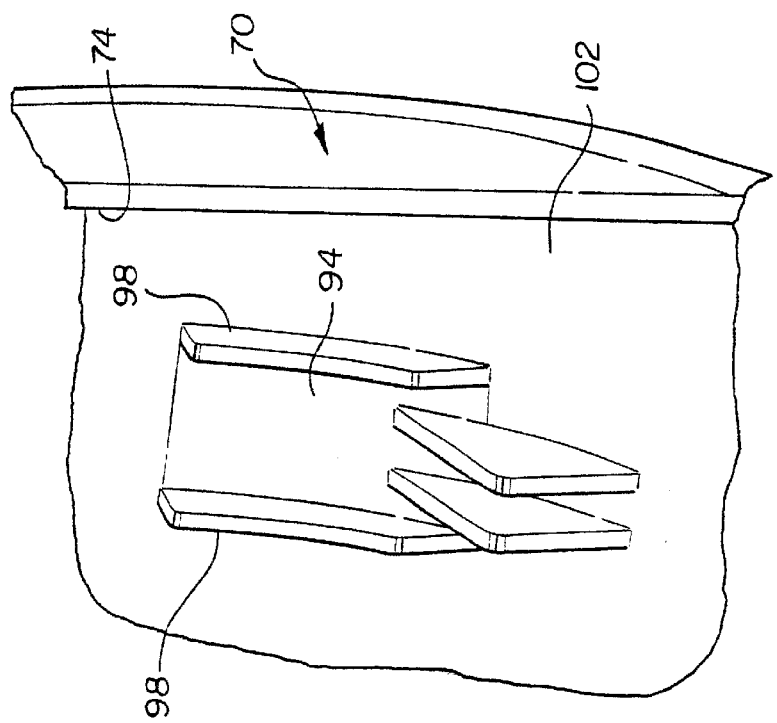
FIG. 11 is a partial magnified perspectical view of a support arm footpad respectacle of the outer shell of FIG. 10.

A breakaway swing-down cup holder assembly 10 constructed according to the invention is shown in FIGS. 4–6. The cup holder assembly 10 is configured to allow an automotive vehicle passenger to re-engage two plastic support arms 12, 13 of the cup holder assembly 10 after the support arms 12, 13 have been pulled free of or otherwise disengaged from respective arm retainers 14, 15 by excessive downward force applied to a cup receiver portion 16 of the cup holder assembly 10. As shown in FIGS. 4–6 the cup holder assembly 10 includes a cup tray 18 supported on a support panel 20 for pivotal motion between a generally horizontal deployed position shown in FIG. 4 and a generally vertical stowed position. The support panel 20 is supported on or may be part of an automotive interior structure such as a seat or instrument panel. The cup tray 18 is shaped to support and hold upright a generally cylindrical beverage container such as a cup or a rectangular prism-shaped drinking container such as a drinking box.

The support arms 12, 13 are fixed to the cup tray 18 and extend through the support panel 20. The support arms 12, 13 are disposed parallel to one another and are slidably received within respective rectangular apertures 22, 24 in the support panel 20 when the tray 18 is in or between the deployed and stowed positions. The support arms 12, 13 are positioned and shaped to slide through the support panel apertures 22, 24 when the cup tray 18 is pivoted between the stowed position and the deployed position.

In the present embodiment the support arms 12, 13 comprise an acetal (polyoxymethylene) formulation, but may comprise any other suitable material in other embodiments. The cup tray 18, support arms 12, 13 and support panel 20 are formed from plastic in the present embodiment but may be formed from any other suitable material known in the art.

Figure 8:
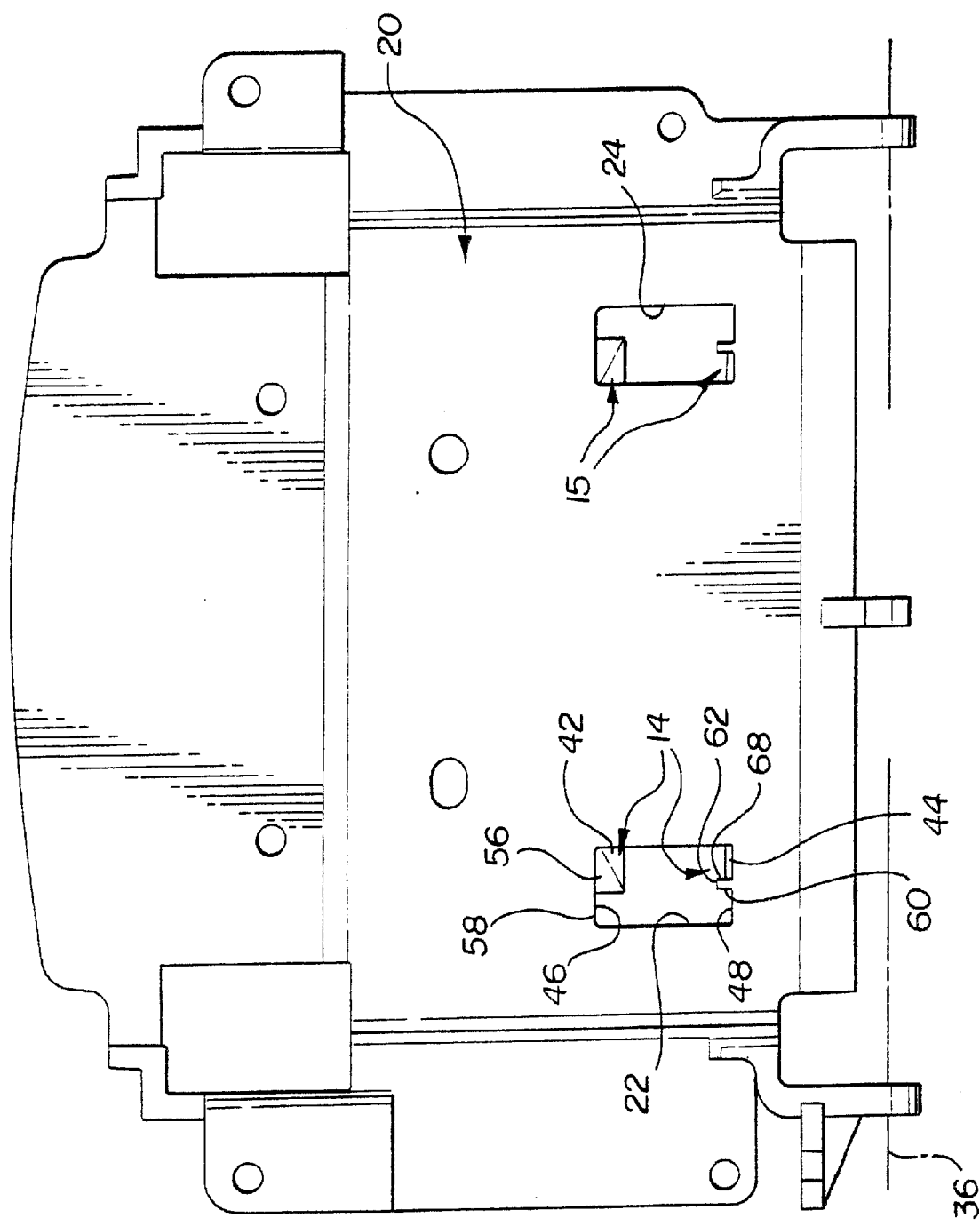
FIG. 8 is a front view of a support panel of the cup holder assembly of FIG. 4.
Figure 9:
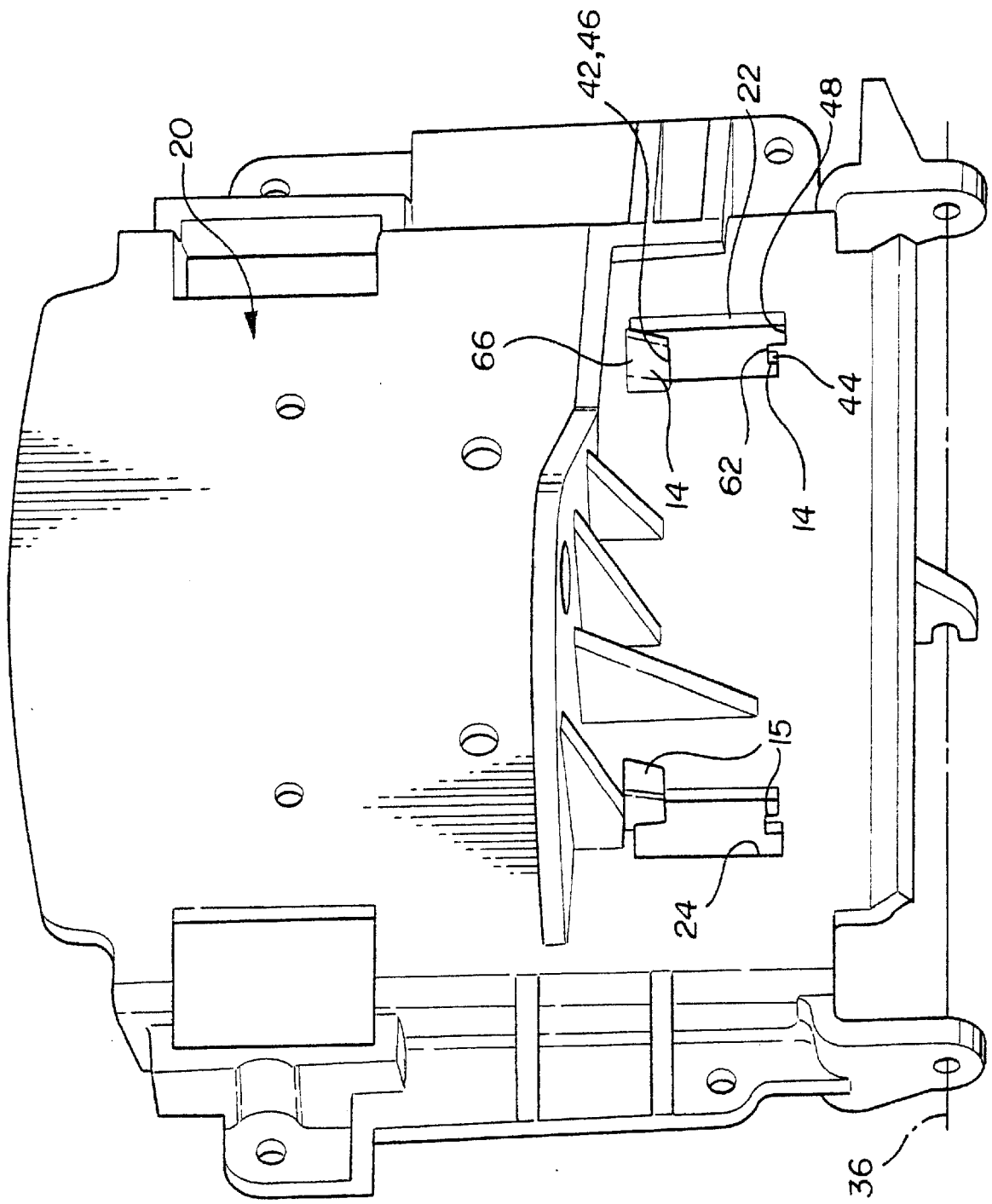
FIG. 9 is a back perspective view of the support panel of FIG. 8.
Figure 10:
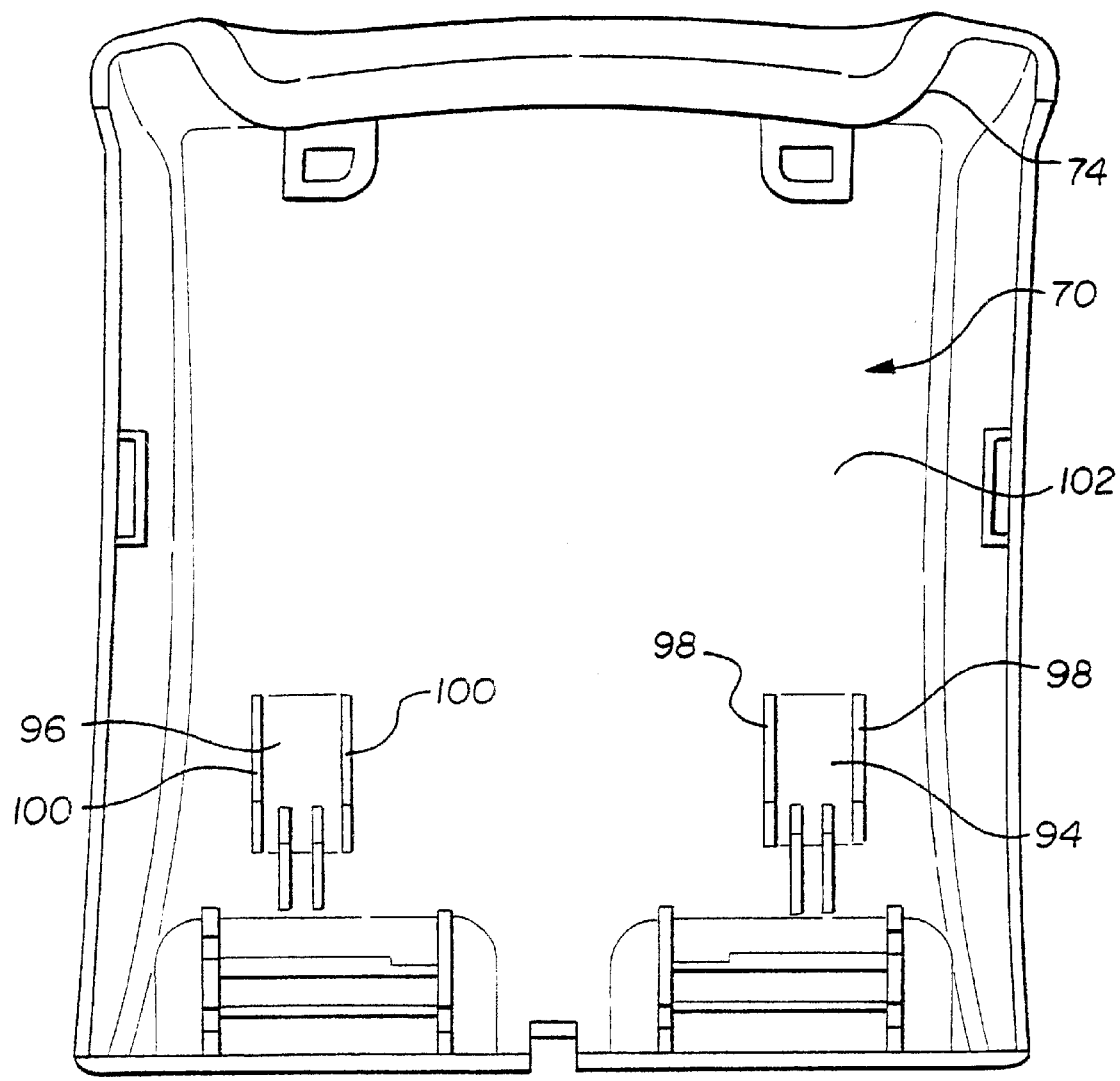
FIG. 10 is a plan view of an outer shell of the cup tray portion of the cup holder assembly of FIG. 4.
Figure 12:
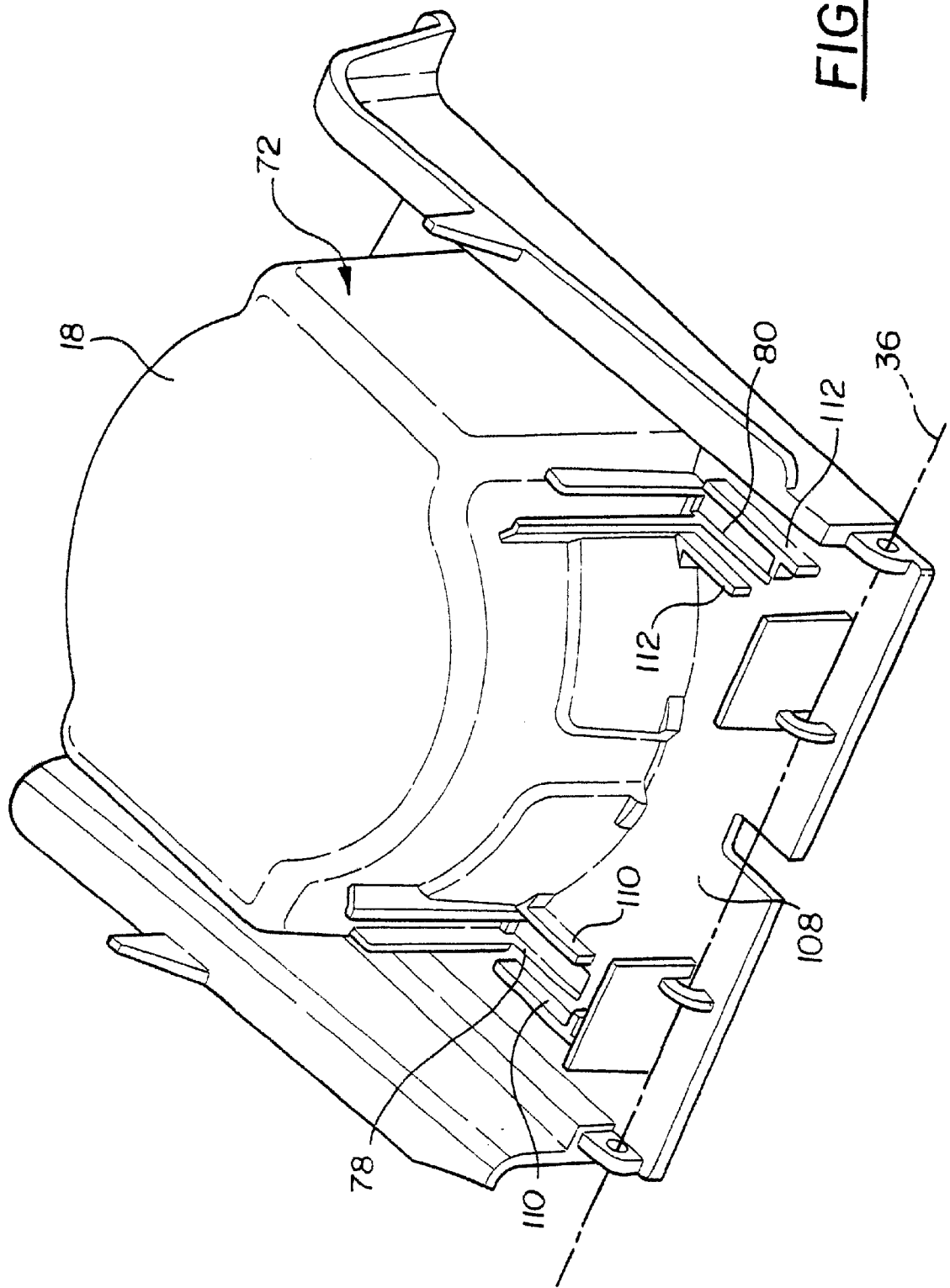
FIG. 12 is a perspective view of an inner shell of the cup tray portion of the cup holder assembly of FIG. 4.

As best shown in FIGS. 8 and 9, the arm retainers 14, 15 are formed within the support panel apertures 22, 24. The retainers 14, 15 are configured to arrest downward cup tray 18 movement at the deployed position by engaging upper and lower arm detents 26, 28 located adjacent respective upper distal ends 30, 32 of the support arms 12, 13 when the cup tray 18 reaches the deployed position. The arm retainers 14, 15 are also shaped to allow the arm detents 26, 28 of the support arms 12, 13 to pull free of their respective arm retainers 14, 15 when a predetermined amount of downward force is applied to the cup tray 18. Once the arm detents 26, 28 have pulled free, the tray 18 is free to pivot below the deployed position without plastically deforming or breaking the tray 18, the support arms 12, 13, the arm retainers 14, 15 or any associated structures.

The arm retainers 14, 15, the arm detents 26, 28 and the upper distal ends 30, 32 of the support arms 12, 13 are configured and positioned such that the arm retainers 14, 15 will receive the respective upper distal ends 30, 32 of the support arms 12, 13 and re-engage the disengaged arm detents 26, 28 as the cup tray 18 is rotated upward into the deployed position. The arm retainers 14, 15 and support arms 12, 13 are so configured to allow an automotive vehicle occupant to quickly and easily re-insert the support arms 12, 13 into their respective apertures 22, 24 and slide the arm detents 26, 28 past their respective arm retainers 14, 15 with a single motion of one hand and without having to directly manipulate the support arm.

The two support arms 12, 13 are essentially identical to each other and the two arm retainers 14, 15 are mirror images of each other. Therefore, for clarity's sake, the remainder of this description will refer only to a first support arm 12 of the two support arms 12, 13, a first aperture 22 of the two apertures 22, 24 and a first arm retainer 14 of the two arm retainers 14, 15.

Figure 7:
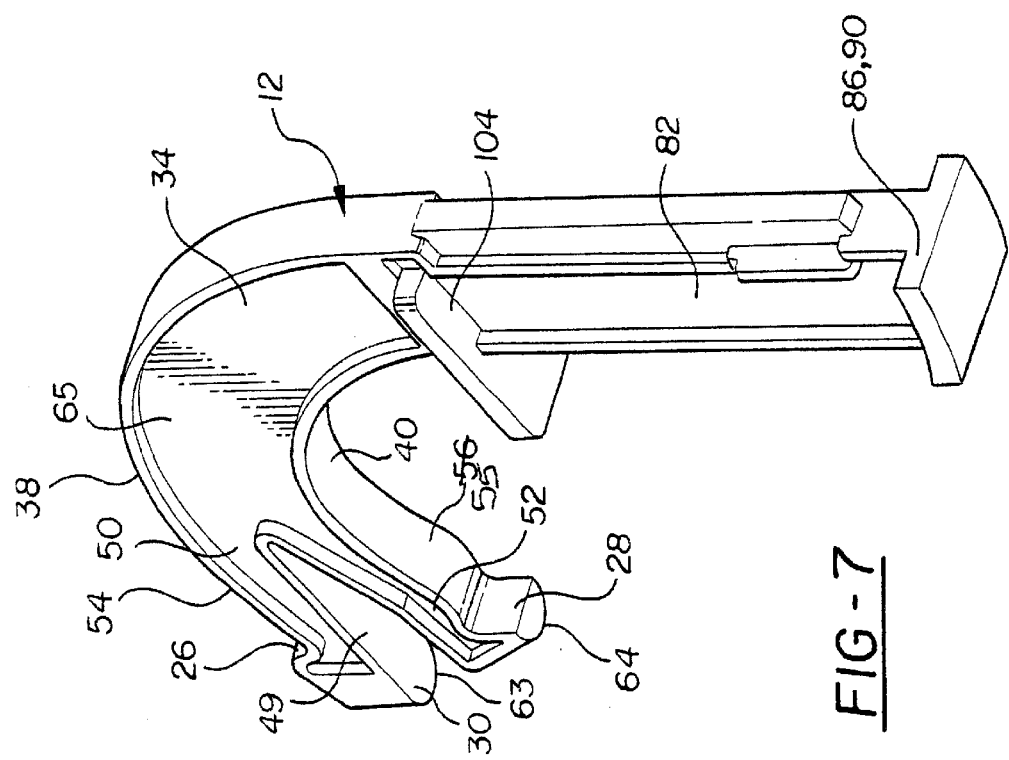
FIG. 7 is a perspective view of one of the support arms of the cup holder assembly of FIG. 4.

Referring to FIG. 7, except for a portion adjacent its upper distal end 30, the first support arm 12 has a generally uniform I-shaped cross-section along most of its length. The first support arm 12 includes a curved upper portion 34 that has a generally constant radius curvature. The first support arm 12 is fixed to the cup tray 18 in a position to dispose the curved upper portion 34 of the first support arm 12 coaxially relative to a pivot axis 36 of the cup tray 18. The coaxial disposition of the curved upper portion 34 of the first support arm 12 allows the curved upper portion 34 of the first support arm 12 to feed into and out of the first support panel aperture 22 as the cup tray 18 is pivoted about the pivot axis 36.

The upper and lower arm detents 26, 28 are formed in respective upper and lower edges 38, 40 of the first support arm 12. Correspondingly, the first arm retainer 14 includes upper and lower retainer detents 42, 44 formed in respective upper and lower surfaces 46, 48 of the first rectangular aperture 22. The arm detents 26, 28 are configured and positioned to engage the retainer detents 42, 44 when the cup tray 18 is in the deployed position.

As best shown in FIG. 7, the upper and lower arm detents 26, 28 have arcuate notch shapes that, when engaged with the respective upper and lower retainer detents 42, 44, resist both upward and downward pivotal movement of the cup tray 18. It is desirable for the arm and retainer detents 26, 28; 42, 44 to cooperate in resisting upward pivotal movement of the cup tray 18 to restrain the cup tray 18 from swinging upward relative to the support panel 20 in response to inadvertent jarring of the cup tray 18 by an occupant or by vehicle motion during driving. As is described above, the arm and retainer detents 26, 28; 42, 44 are also shaped to resist downward pivotal tray 18 movement to support a beverage container in an upright attitude.

The first support arm 12 is split longitudinally from the upper distal end 30 of the first support arm 12 inward to form a split region 49 having upper and lower engagement fingers 50, 52. The upper arm detent 26 is formed in an upper edge 54 of the upper engagement finger 50 and the lower arm detent 28 is formed in a lower edge 55 of the lower engagement finger 52. The split region 49 of the first support arm 12 is configured to resist a predetermined amount of extraction force before the upper and lower engagement fingers 50, 52 will deflect towards each other sufficiently to allow the upper and lower arm detents 26, 28 to disengage from the upper and lower retainer detents 42, 44. The amount of extraction force required is dependent on a number of factors do include materials, the thickness of the fingers 50, 52 and the cross-sectional shape of the fingers 50, 52.

As best shown in FIGS. 8 and 9, the first arm retainer 14 includes an upper-outer ramp 56 supported immediately behind a forward upper edge 58 of the first rectangular aperture 22 and a lower-outer ramp 60 disposed on one side of a lower ramp tab 62 that extends integrally upward from the lower surface 48 of the first rectangular aperture 22. The upper and lower-outer ramps 56, 60 are positioned and angled to simultaneously engage the respective upper and lower engagement fingers 50, 52 of the first support arm 12 as the first support arm 12 is being re-inserted into the first aperture 22 following disengagement.

After engaging the engagement fingers 50, 52, the upper and lower-outer ramps 56, 60 laterally deflect the distal end 30 of the first support arm 12 away from and out of alignment with the upper and lower retainer detents 42, 44 as the first support arm 12 is being inserted into the first aperture 22 following disengagement. Leading edges 63, 64 of the upper and lower engagement fingers 50, 52 are laterally rounded to facilitate lateral deflection upon ramp contact. The upper and lower-outer ramps 56, 60 extend into the first aperture 22 only far enough to initially engage and deflect the wider distal end 30 of the first support arm 12. Once the distal end 30 has passed the upper and lower-outer ramps 56, 60, a vertically narrower portion 65 of the first support arm 12 passes through the first aperture 22 and disengages from the upper and lower-outer ramps 56, 60.

Upon disengagement, the first support arm 12 snaps back into alignment with the upper and lower retainer detents 42, 44. As a result, the upper and lower-outer ramps 56, 60 allow a vehicle occupant to re-insert the first support arm 12 using less force than would otherwise be required to force the upper and lower engagement fingers 50, 52 past the upper and lower retainer detents 42, 44. Once the first support arm 12 has been re-inserted into the first aperture 22, subsequent downward pivoting of the cup tray 18 to the deployed position will draw the upper and lower arm detents 26, 28 into engagement with the respective upper and lower retainer detents 42, 44.

To ensure that the support arm detents 26, 28 positively engage the retainer detents 42, 44, the first arm retainer 14 includes an upper-inner ramp 66 disposed adjacent and facing in a direction generally opposite the upper-outer ramp 56. In addition, a lower-inner ramp 68 is disposed on a side of the lower ramp tab 62 opposite the lower-outer ramp 60. The upper and lower-inner ramps 66, 68 are positioned and angled to simultaneously engage the respective upper and lower engagement fingers 50, 52 of the first support arm 12 as the first support arm 12 is being drawn outward through the first aperture 22 as the cup tray 18 is pivoted downward toward the deployed position. After engaging the engagement fingers 50, 52, the upper and lower-inner ramps 66, 68 cooperate to laterally deflect and positively locate the distal end 30 of the first support arm 12 in alignment with the retainer detents 42, 44. The upper and lower-inner ramps 66, 68 extend into the first aperture 22 only far enough to engage and deflect the wider distal end 30 of the first support arm 12.

The vertical width of the first support arm 12 is tapered in the split region 49 so that downward pivotal motion of the cup tray 18 will cause the stationary upper and lower retainer detents 42, 44 to gradually squeeze the upper and lower engagement fingers 50, 52 together as the distal end 30 slides through the first aperture 22. The upper and lower engagement fingers 50, 52 then snap back apart when the upper and lower arm detents 26, 28 engage the upper and lower retainer detents 42, 44. The tapering of the split region 49 of the first support arm 12 reduces the amount of operator effort required to move the cup tray 18 into the deployed position.

The cup tray 18 includes an outer shell shown at 70 in FIGS. 4–6, 10 and 11 and an inner shell shown at 72 in FIGS. 4–6 and 12. The inner shell 72 closes an upper opening 74 of the outer shell 70. The inner shell 72 includes a generally cylindrical recess 76 shaped to support and hold upright a generally cylindrical beverage container such as a cup or a rectangular prism-shaped container such as a drink box. The inner shell 72 also includes two arm receptacle openings 78, 80 configured and positioned to receive respective base portions 82, 84 of the support arms 12, 13.

Lower distal ends 86, 88 of the respective support arm base portion 82, 84 include respective rectangular footpads shown at 90 and 92 in FIG. 7. The footpads 90, 92 are shaped and positioned to be received in respective footpad receptacles 94, 96 of the outer shell 70 when the inner and outer shells 72, 70 are joined together. The footpad receptacles 94, 96 are partially defined by parallel ribs 98, 100 that extend upward from an inner surface 102 of the outer shell 70. The footpad receptacles 94, 96 preclude lateral movement of the footpads 90, 92 and the base portions 82, 84 of the support arms 12, 13.

The support arms 12, 13 also include respective rectangular flanges 104, 106 that extend integrally outward from around the arms 12, 13 at approximate locations along the lengths of the arms 12, 13 where the curved upper portions of the support arms 12, 13 join the respective base portions 82, 84 of the support arms 12, 13. The flanges 104, 106 are positioned to engage an inner surface 108 of the inner shell 72 surrounding the arm receptacle openings 78, 80 to anchor the first support arm 12 against withdrawal from the cup tray 18.

Adjacent each arm receptacle opening 78, 80 the inner shell 72 includes integral ribs 110, 112 shaped and positioned to engage the support arms 12, 13 and the flanges 104, 106 to further stabilize the support arms 12, 13. In other words, the footpad receptacles 94, 96 of the outer shell 70, the arm receptacle openings 78, 80 and adjacent integral ribs 110, 112 in the inner shell 72, the support arm flanges 104, 106 and the support arm footpads 90, 92 cooperate to fix the support arms 12, 13 relative to the cup tray 18 without requiring fasteners or adhesives.

This description is intended to illustrate certain embodiments of the invention rather than to limit the invention. Therefore descriptive rather than limiting words are used. Obviously, it's possible to modify this invention from what the described construction and to practice the invention other than as described.

What is claimed is:

1. A breakaway swing-down cup holder assembly comprising:
    a support panel configured to be supported on an automotive interior structure;
    a cup tray supported on the support panel for pivotal motion between a generally horizontal deployed position and a generally vertical stowed position, the cup tray being shaped to support and hold upright a beverage container;
    a support arm connected to the cup tray and slidably received within an aperture in the support panel when the tray is in or between the deployed and stowed positions, the support arm being positioned to slide through the support panel aperture when the cup tray is pivoted between the stowed position and the deployed position;
    an arm retainer disposed on the support panel adjacent the aperture and configured to arrest downward cup tray movement at the deployed position by engaging and retaining a support arm detent of the support arm when the cup tray reaches the deployed position, the arm retainer and distal end being configured to allow the support arm detent to disengage from the arm retainer when a predetermined amount of downward force is applied to the cup tray to allow the tray to pivot downward past the deployed position without plastically deforming or breaking the tray, the support arm, the arm retainer or any associated structures; and
    the arm retainer and the support arm being configured and positioned such that upward pivoting of the cup tray following disengagement causes the support arm detent to re-engage the arm retainer thus allowing an automotive vehicle passenger to quickly and easily re-engage the support arm using a single motion of one hand and without having to directly manipulate the support arm.

2. A breakaway swing-down cup holder assembly as defined in claim 1 in which:
    the assembly includes a second support arm connected between the cup tray and the support panel portion of the automotive interior structure;
    the second support arm is slidably received within a second aperture in the support panel when the tray is in or between the deployed and stowed positions;
    the support arms are disposed generally parallel to one another and are positioned to slide through the support panel apertures when the cup tray is pivoted between the stowed position and the deployed position;
    the assembly also includes a second arm retainer disposed adjacent the second aperture in the support panel;
    the second arm retainer is configured to arrest downward cup tray movement at the deployed position by engaging and retaining a support arm detent of the second support arm when the cup tray reaches the deployed position;

the second arm retainer is further configured to allow the second support arm detent to disengage from the second arm retainer when a predetermined amount of downward force is applied to the cup tray; and the second arm retainer and the second support arm are configured and positioned such that upward pivoting of the cup tray following disengagement causes the second support arm detent to re-engage the second arm retainer.

3. A breakaway swing-down cup holder assembly as defined in claim 1 in which:

the support arm includes a curved portion having a generally constant radius curvature;

the support arm is fixed to the cup tray in a position disposing the curved portion of the support arm coaxially relative to a pivot axis of the cup tray to allow the curved portion of the support arm to feed into and out of the support panel aperture as the cup tray is pivoted about the pivot axis.

4. A breakaway swing-down cup holder assembly as defined in claim 1 in which:

the support arm includes an arm upper detent formed in an upper edge of the arm;

the arm retainer includes a retainer upper detent in an upper surface of the aperture; and the arm upper detent is configured and positioned to engage the retainer upper detent when the cup tray is in the deployed position.

5. A breakaway swing-down cup holder assembly as defined in claim 1 in which:

the support arm includes an arm lower detent formed in a lower edge of the arm;

the arm retainer includes a retainer lower detent in a lower surface of the aperture; and the arm lower detent is configured and positioned to engage the retainer lower detent when the cup tray is in the deployed position.

6. A breakaway swing-down cup holder assembly as defined in claim 1 in which:

the support arm includes an arm upper detent formed in an upper edge of the arm and an arm lower detent formed in a lower edge of the arm;

the arm retainer includes a retainer upper detent in an upper surface of the aperture and a retainer lower detent in a lower surface of the aperture; and the arm upper and lower detents are configured and positioned to engage the retainer upper and lower detents, respectively, when the cup tray is in the deployed position.

7. A breakaway swing-down cup holder assembly as defined in claim 6 in which the arm upper and lower detents are shaped to resist both upward and downward pivotal movement of the cup tray when engaging the respective retainer upper and lower detents.

8. A breakaway swing-down cup holder assembly as defined in claim 7 in which:

the support arm is split longitudinally from a distal end of the support arm inward to form a split region having upper and lower engagement fingers;

the arm upper detent is formed in an upper edge of the upper engagement finger;

the arm lower detent is formed in a lower edge of the lower engagement finger.

9. A breakaway swing-down cup holder assembly as defined in claim 8 in which the split region of the support arm is configured to resist a predetermined amount of extraction force before the upper and lower engagement fingers will deflect towards each other sufficiently to allow the upper and lower arm detents to disengage from the upper and lower retainer detents.

10. A breakaway swing-down cup holder assembly as defined in claim 8 in which a vertical width of the support arm is tapered in the split region such that downward pivotal motion of the cup tray causes the upper and lower retainer detents to compress the upper and lower engagement fingers together as the split region slides through the aperture and then spread apart when the upper and lower arm detents engage the upper and lower retainer detents.

11. A breakaway swing-down cup holder assembly as defined in claim 8 in which:

ramps are supported adjacent the aperture and are configured and oriented to laterally deflect the upper and lower detents of the support arm away from the upper and lower retainer detents as the support arm is being re-inserted into the aperture following disengagement; and the ramps are configured and located to allow the support arm to slide off the ramps and cause the upper and lower engagement fingers to spring back into a position aligning the support arm detents with the retainer detents once a narrower portion of the arm reaches the ramps during re-insertion.

12. A breakaway swing-down cup holder assembly as defined in claim 11 in which other ramps are supported adjacent the aperture and are configured and oriented to urge the upper and lower detents of the support arm laterally into alignment with the retainer detents as the support arm is being drawn outward through the aperture as the cup tray is pivoted downward into the deployed position.

13. A breakaway swing-down cup holder assembly as defined in claim 1 in which the cup tray includes an outer shell and an inner shell that closes an upper opening of the outer shell, the inner shell including a recess shaped to support and hold upright a beverage container, the inner shell also including an opening configured and positioned to receive a base portion of the support arm.

14. A breakaway swing-down cup holder assembly as defined in claim 13 in which the lower distal end of the base portion of the support arm is received in a walled pocket that extends upward from an inner surface of the outer shell, the walled pocket being configured to preclude lateral movement of the lower distal end of the base portion of the support arm.

15. A breakaway swing-down cup holder assembly as defined in claim 14 in which the support arm includes a flange that extends integrally outward and is positioned to engage an inner surface of the inner shell to retain the support arm against withdrawal from the cup tray.

* * * * *